US009651109B2

(12) United States Patent
Noguchi

(10) Patent No.: US 9,651,109 B2
(45) Date of Patent: May 16, 2017

(54) SHOCK ABSORBER AND SUSPENSION APPARATUS

(71) Applicant: KYB Corporation, Tokyo (JP)

(72) Inventor: Nobuhiro Noguchi, Aichi (JP)

(73) Assignee: KYB Corporation, Tokyo (JP)

(*) Notice: Subject to any disclaimer, the term of this patent is extended or adjusted under 35 U.S.C. 154(b) by 0 days.

(21) Appl. No.: 14/914,010

(22) PCT Filed: Sep. 22, 2014

(86) PCT No.: PCT/JP2014/075002
§ 371 (c)(1),
(2) Date: Feb. 24, 2016

(87) PCT Pub. No.: WO2015/046102
PCT Pub. Date: Apr. 2, 2015

(65) Prior Publication Data
US 2016/0215846 A1     Jul. 28, 2016

(30) Foreign Application Priority Data
Sep. 24, 2013   (JP) .................................. 2013-196348

(51) Int. Cl.
*F16F 9/32*     (2006.01)
*F16F 9/34*     (2006.01)
(Continued)

(52) U.S. Cl.
CPC ................ *F16F 9/34* (2013.01); *B60G 13/08* (2013.01); *B62K 25/08* (2013.01); *F16F 9/32* (2013.01);
(Continued)

(58) Field of Classification Search
CPC .......... F16F 9/32; F16F 9/3242; F16F 9/3257; F16F 9/34; F16F 9/44; F16F 9/063;
(Continued)

(56) References Cited

U.S. PATENT DOCUMENTS 4,936,424 A * 6/1990 Costa ...................... F16F 9/064
188/314
5,178,240 A * 1/1993 Houghton ............... F16F 9/003
137/513.7
(Continued)

FOREIGN PATENT DOCUMENTS

JP     58-000089 U1    1/1983
JP     05-014694 U     2/1993
(Continued)

*Primary Examiner* — Thomas Irvin
(74) *Attorney, Agent, or Firm* — Rabin & Berdo, P.C.

(57) ABSTRACT

A shock absorber includes a telescopic tube member configured to include a vehicle body side tube and a vehicle wheel side tube, a cap member that closes an upper side opening of the vehicle body side tube, a cylinder erected in an axial center portion of the vehicle wheel side tube, a piston rod held by the cap member and configured to enter and exit the cylinder, a reservoir formed between the tube member and the cylinder, a cap interior passage formed in the cap member and configured to connect the rod interior passage to the reservoir, a plurality of valve bodies provided in series or in parallel midway in the cap interior passage, and a plurality of adjusters attached to the cap member and configured to be capable of adjusting a valve opening pressure or an opening amount of the plurality of valve bodies.

4 Claims, 4 Drawing Sheets

(51) Int. Cl.
 B62K 25/08 (2006.01)
 F16F 9/44 (2006.01)
 B60G 13/08 (2006.01)

(52) U.S. Cl.
 CPC .......... F16F 9/3242 (2013.01); F16F 9/3257 (2013.01); F16F 9/44 (2013.01); F16F 2222/12 (2013.01)

(58) Field of Classification Search
 CPC ...... F16F 9/486; F16F 2222/12; B60G 13/08; B62K 25/08
 USPC .... 188/322.13, 322.14, 322.15, 322.22, 285, 188/297, 313, 314, 315
 See application file for complete search history.

(56) References Cited

U.S. PATENT DOCUMENTS

| | | | | |
|---|---|---|---|---|
| 6,840,357 B2 * | 1/2005 | Toiyama | ............... | F16F 9/3242 188/319.2 |
| 6,926,128 B2 * | 8/2005 | Barbison | ............... | B60G 17/08 188/315 |
| 7,448,479 B2 * | 11/2008 | Fukuda | ................... | F16F 9/465 188/266.2 |
| 7,926,795 B2 * | 4/2011 | Furuya | ................... | B62K 25/08 188/312 |
| 8,235,187 B2 * | 8/2012 | Murakami | ............... | F16F 9/462 188/285 |
| 8,256,588 B2 * | 9/2012 | Mori | ....................... | B62K 25/08 188/298 |
| 8,550,223 B2 * | 10/2013 | Cox | ........................ | F16F 9/49 188/318 |
| 8,616,351 B2 * | 12/2013 | Roessle | ................... | F16F 9/348 188/266.5 |
| 8,622,180 B2 * | 1/2014 | Wootten | .................. | F16F 9/461 188/278 |
| 8,783,696 B2 * | 7/2014 | Murakami | ............. | B60G 13/08 188/322.15 |
| 8,820,494 B2 * | 9/2014 | Nagai | ..................... | F16F 9/185 188/282.1 |
| 8,869,959 B2 * | 10/2014 | Yablon | ................... | B60G 11/27 188/319.1 |
| 9,440,704 B2 * | 9/2016 | Kasuga | ................. | B62K 25/283 |
| 2008/0230335 A1 * | 9/2008 | Furuya | .................. | B62K 25/08 188/315 |
| 2011/0227301 A1 * | 9/2011 | Nagai | ................ | B60G 17/0272 280/6.157 |
| 2015/0233442 A1 * | 8/2015 | Noguchi | .................. | F16F 9/48 188/284 |
| 2015/0323036 A1 * | 11/2015 | Noguchi | .................. | F16F 9/446 188/280 |

FOREIGN PATENT DOCUMENTS

JP        2010-15901       7/2010
JP        2012-047341 A    3/2012

* cited by examiner

SHOCK ABSORBER AND SUSPENSION APPARATUS

TECHNICAL FIELD

This invention relates to a shock absorber and a suspension apparatus.

BACKGROUND ART

A shock absorber used in a suspension apparatus that supports a vehicle wheel of a vehicle typically includes a cylinder, a piston rod that enters and exits the cylinder, a piston held by the piston rod so as to move through the cylinder in an axial direction, an expansion side chamber and a contraction side chamber that are formed in the cylinder, defined by the piston, and filled with a working fluid, a passage connecting the expansion side chamber and the contraction side chamber, and a valve body provided in the passage. When the shock absorber expands and contracts, one of the chambers contracts and the other chamber expands such that the working fluid in the contracting chamber moves into the expanding chamber through the passage. As a result, the shock absorber generates damping force from resistance in the valve body.

In a shock absorber disclosed in JP2012-47341A, for example, two valve bodies, namely a leaf valve on which an initial load is exerted by a biasing spring and a needle valve that forms an orifice, are provided in parallel midway in a passage that connects an expansion side chamber to a contraction side chamber. When a piston speed is in a low speed region, the shock absorber generates damping force from resistance in the orifice formed by the needle valve, and when the piston speed increases so as to reach a medium/high speed region, the shock absorber generates damping force from resistance in the leaf valve. A first adjuster for adjusting an opening amount of the needle valve and a second adjuster for adjusting a valve opening pressure of the leaf valve are attached to a cap member that holds a piston rod. As a result, the two types of damping force generated respectively when the piston speed is in the low speed region and when the piston speed is in the medium/high speed region can be adjusted.

SUMMARY OF INVENTION

In the conventional shock absorber described above, however, the valve bodies to be operated are disposed in a piston portion on an inner side of a cylinder so as to be separated from the adjusters that are actually operated by a user, and therefore a pushrod is inserted into a hollow portion of the piston rod so as to be interposed between the valve body and the adjuster. Particularly in a case where two types of damping force are adjusted, as in this conventional shock absorber, two pushrods must be driven individually, leading to an increase in a number of components and an increase in structural complexity.

An object of this invention is to provide a shock absorber and a suspension apparatus with which a plurality of types of damping force can be adjusted while suppressing an increase in a number of components and achieving structural simplicity.

According to one aspect of the present invention, a shock absorber includes a telescopic tube member configured to include a vehicle body side tube and a vehicle wheel side tube, a cap member that closes an upper side opening of the vehicle body side tube, a cylinder erected in an axial center portion of the vehicle wheel side tube, a piston rod held by the cap member and configured to enter and exit the cylinder, a piston held by the piston rod and configured to move through the cylinder in an axial direction, a reservoir formed between the tube member and the cylinder, an expansion side chamber and a contraction side chamber that are formed in the cylinder, defined by the piston, and configured to be filled with a working fluid, a rod interior passage formed in the piston rod, and configured to extend in an axial direction of the piston rod and open onto either the expansion side chamber or the contraction side chamber, a cap interior passage formed in the cap member and configured to connect the rod interior passage to the reservoir, a plurality of valve bodies provided in series or in parallel midway in the cap interior passage, and a plurality of adjusters attached to the cap member and configured to be capable of adjusting a valve opening pressure or an opening amount of the plurality of valve bodies.

DESCRIPTION OF EMBODIMENTS

Embodiments of this invention will be described below with reference to the attached figures. Reference symbols that are identical over several figures denote identical or corresponding components.

Figure 1:
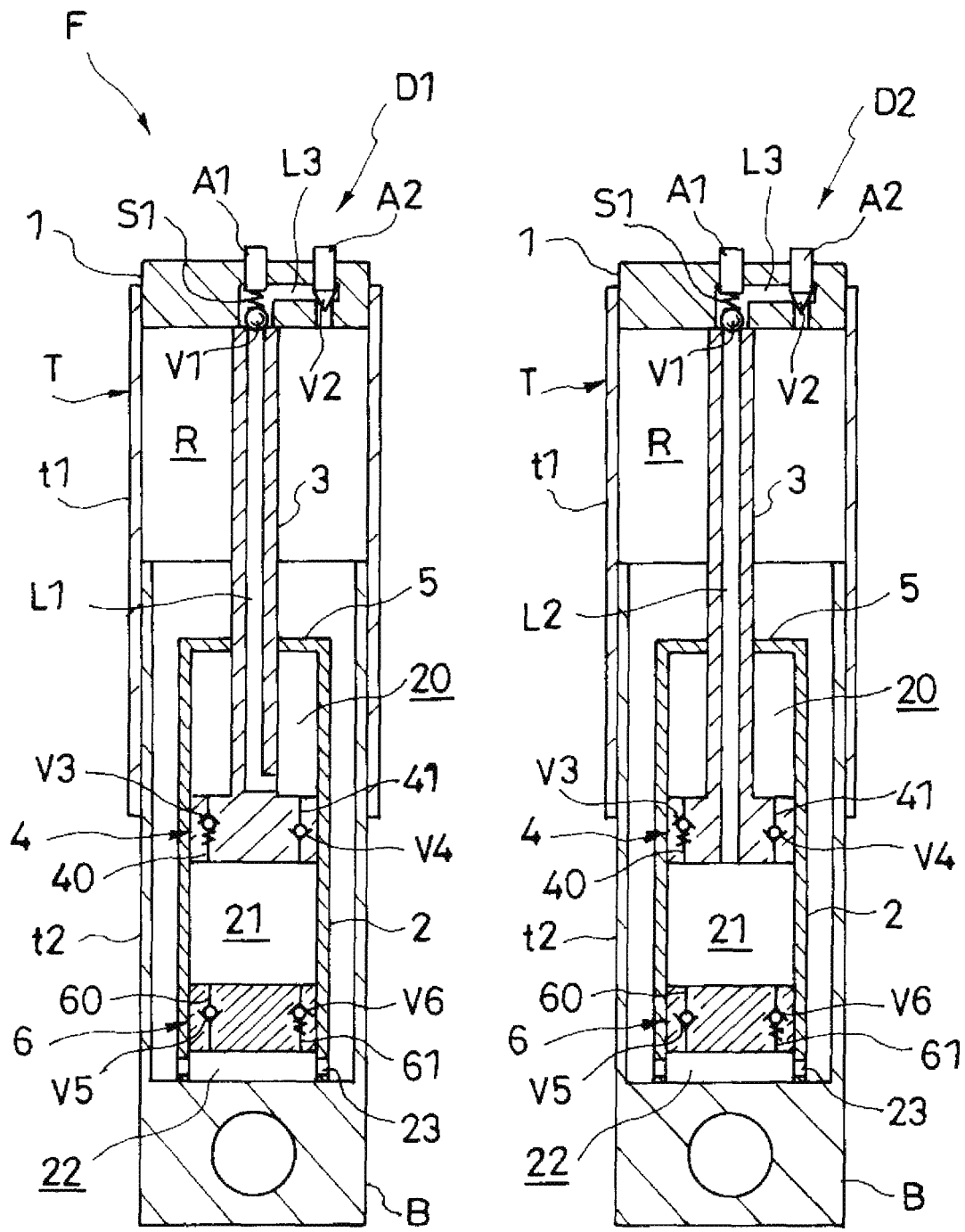
FIG. 1 is a theoretical diagram illustrating main parts of a suspension apparatus including a pair of shock absorbers according to one embodiment of this invention.

As shown in FIG. 1, shock absorbers D1, D2 according to this embodiment each include a telescopic tube member T constituted by a vehicle body side tube t1 and a vehicle wheel side tube t2, a cap member 1 that closes an upper side opening of the vehicle body side tube t1, a cylinder 2 erected in an axial center portion of the vehicle wheel side tube t2, a piston rod 3 held by the cap member 1 so as to enter and exit the cylinder 2, a piston 4 held by the piston rod 3 so as to move through the cylinder 2 in an axial direction, a reservoir R formed between the tube member T and the cylinder 2, and an expansion side chamber 20 and the contraction side chamber 21 that are formed in the cylinder 2, defined by the piston 4, and filled with a working fluid.

Rod interior passages L1, L2 are formed in the piston rod 3 so as to extend in an axial direction of the piston rod 3 and open onto the expansion side chamber 20 or the contraction side chamber 21. Further, a cap interior passage L3 that connects the rod interior passages L1, L2 to the reservoir R is formed in the cap member 1, while a plurality of valve bodies V1, V2 provided in series midway in the cap interior passage L3 and a plurality of adjusters A1, A2 capable of adjusting a valve opening pressure or an opening amount of the valve bodies V1, V2 are attached to the cap member 1.

More specifically, the shock absorbers D1, D2 according to this embodiment are used in a suspension apparatus F known as a front fork, and the suspension apparatus F supports a front wheel of a saddled vehicle such as a two-wheeled or three-wheeled vehicle. The front fork, which has a well-known configuration and is not therefore illustrated in detail in the figures, includes the pair of shock absorbers D1, D2 that stand upright on either side of the front wheel, a vehicle body side bracket (not shown) that connects the shock absorbers D1, D2 and is connected to a vehicle body frame serving as a skeleton of the vehicle body, and a vehicle wheel side bracket B that connects respective lower end portions of the pair of shock absorbers D1, D2 to an axle of the front wheel. In this embodiment, the front fork includes the pair of shock absorbers D1, D2, but one of the shock absorbers D1, D2 and another shock absorber may form a pair. Furthermore, the shock absorbers D1, D2 according to this embodiment may be used in a suspension apparatus other than a front fork, or in an application other than a suspension apparatus.

The shock absorbers D1, D2 each includes the telescopic tube member T constituted by the vehicle body side tube t1 and the vehicle wheel side tube t2. The tube member T serves as an outer shell of each of the shock absorbers D1, D2. In this embodiment, the vehicle body side tube t1 is formed to have a larger diameter than the vehicle wheel side tube t2, the vehicle body side bracket (not shown) is fixed to an outer periphery of the vehicle body side tube t1, and the vehicle wheel side bracket B is fixed to a lower end portion of the vehicle wheel side tube t2. Hence, when an impact caused by a road surface irregularity is input, the vehicle wheel side tube t2 enters and exits the vehicle body side tube t1 such that the two shock absorbers D1, D2 expand and contract simultaneously. It should be noted that the vehicle wheel side tube t2 may be formed to have a larger diameter than the vehicle body side tube t1 so that the vehicle body side tube t1 enters and exits the vehicle wheel side tube t2.

An upper side opening of the tube member T of each of the shock absorbers D1, D2 is closed by the cap member 1, the cap member 1 being attached to an upper end portion of the vehicle body side tube t1. A lower side opening of the tube member T is closed by the vehicle wheel side bracket B provided on the lower end portion of the vehicle wheel side tube t2. A tubular gap (not shown) formed in an overlapping portion between the vehicle body side tube t1 and the vehicle wheel side tube t2 is closed by an annular seal member (not shown) that is held on a lower end portion inner periphery of the vehicle body side tube t1 so as to slide against an outer peripheral surface of the vehicle wheel side tube t2. The tube member T is thus made airtight. As a result, a working fluid and a gas housed in the tube member T do not leak to the outside.

Furthermore, each of the shock absorbers D1, D2 includes the cylinder 2 erected in the axial center portion of the vehicle wheel side tube t2, an annular rod guide 5 that is fixed to an upper end portion of the cylinder 2 so as to close an upper side opening of the cylinder 2, the piston rod 3 of which an upper end portion is held by the cap member 1 so that the piston rod 3 enters and exits the cylinder 2 while being axially supported by the rod guide 5, the piston 4 that is held by a lower end portion of the piston rod 3 so as to move through the cylinder 2 in the axial direction, and a base member 6 fixed to a lower portion inner periphery of the cylinder 2.

The reservoir R in which the working fluid and the gas are sealed is formed between the tube member T and the cylinder 2. Meanwhile, the expansion side chamber 20 and the contraction side chamber 21, which are defined by the piston 4 and filled with the working fluid, and a fluid retention chamber 22, which is defined by the contraction side chamber 21 and the base member 6 and filled with the working fluid, are formed in the cylinder 2. A through hole 23 is formed in the cylinder 2 directly below the base member 6 so that the working fluid can move freely between the fluid retention chamber 22 and the reservoir R through the through hole 23.

An expansion side piston passage 40 and a contraction side piston passage 41 are formed in the piston 4, the piston 4 defining the expansion side chamber 20 and the contraction side chamber 21, so as to connect the expansion side chamber 20 to the contraction side chamber 21. An expansion side damping valve V3 that allows the working fluid to flow from the expansion side chamber 20 toward the contraction side chamber 21 but prevents the working fluid from flowing in an opposite direction is provided in the expansion side piston passage 40. A resistance exerted by the expansion side damping valve V3 on the working fluid passing through the expansion side piston passage 40 is set to be comparatively large. A contraction side check valve V4 that allows the working fluid to flow from the contraction side chamber 21 toward the expansion side chamber 20 but prevents the working fluid from flowing in an opposite direction is provided in the contraction side piston chamber 41. A resistance exerted by the contraction side check valve V4 on the working fluid passing through the contraction side piston passage 41 is set to be comparatively small. The expansion side damping valve V3 and the contraction side check valve V4 used in this embodiment are common to the respective shock absorbers D1, D2. This invention is not limited thereto, however, and the valve structures provided in the piston 4 parts of the respective shock absorbers D1, D2 may be modified appropriately.

An expansion side base member passage 60 and a contraction side base member passage 61 are formed in the base member 6, the base member 6 defining the contraction side chamber 21 and the fluid retention chamber 22, so as to connect the contraction side chamber 21 to the fluid retention chamber 22. An expansion side check valve V5 that allows the working fluid to flow from the fluid retention chamber 22 toward the contraction side chamber 21 but prevents the working fluid from flowing in an opposite direction is provided in the expansion side base member passage 60. A resistance exerted by the expansion side check valve V5 on the working fluid passing through the expansion side base member passage 60 is set to be comparatively small. A contraction side damping valve V6 that allows the working fluid to flow from the contraction side chamber 21 toward the fluid retention chamber 22 but prevents the working fluid from flowing in an opposite direction is provided in the contraction side base member passage 61. A resistance exerted by the contraction side damping valve V6 on the working fluid passing through the contraction side base member passage 61 is set to be comparatively large. The expansion side check valve V5 and the contraction side damping valve V6 used in this embodiment are common to the respective shock absorbers D1, D2. This invention is not limited thereto, however, and the valve structures provided in the base member 6 parts of the respective shock absorbers D1, D2 may be modified appropriately.

Figure 2A:
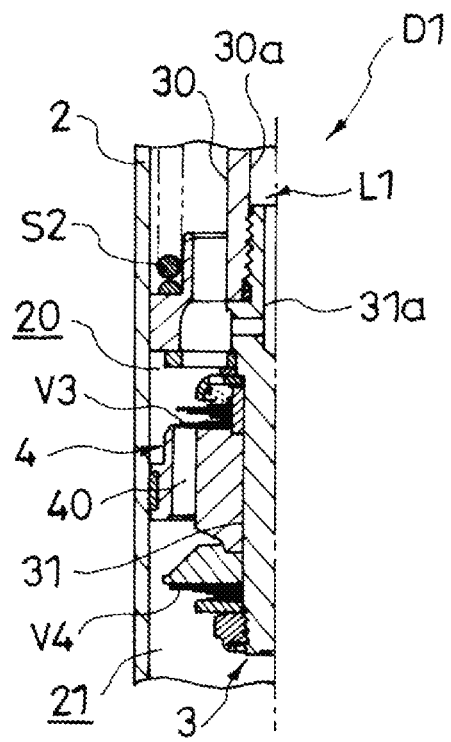
FIG. 2A is an enlarged longitudinal sectional view showing a specific example of a piston part of one shock absorber in the suspension apparatus including a pair of shock absorbers according to one embodiment of this invention.
Figure 2B:
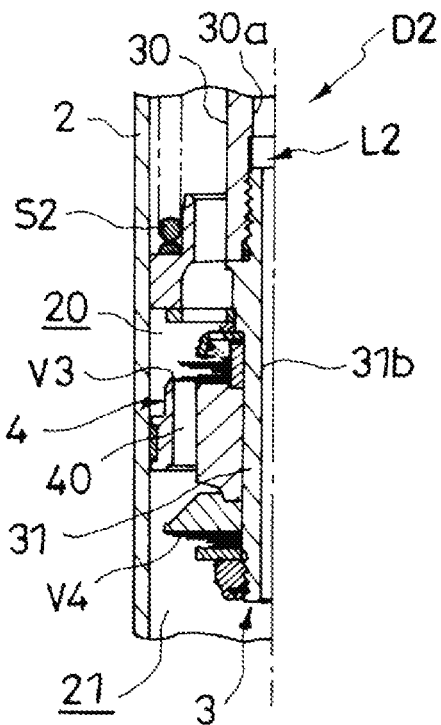
FIG. 2B is an enlarged longitudinal sectional view showing a specific example of a piston part of the other shock absorber in the suspension apparatus including a pair of shock absorbers according to one embodiment of this invention.

As shown in FIGS. 1, 2A, and 2B, the piston rod 3 that holds the piston 4 includes a shaft member 30 that is formed in a tubular shape, held by the cap member 1, and axially supported by the rod guide 5, and a center rod 31 that is screwed into a tip end portion inner periphery of the shaft member 30 so as to hold the piston 4 on an outer periphery thereof. As shown in FIG. 2A, a passage 31a that extends from a central hole 30a in the shaft member 30 and opens onto the expansion side chamber 20 is formed in the center rod 31 of the shock absorber D1. The passage 31a, together with the central hole 30a, constitutes the rod interior passage L1 that opens onto the expansion side chamber 20. Further, as shown in FIG. 2B, a passage 31b that extends from the central hole 30a in the shaft member 30 and opens onto the contraction side chamber 21 is formed in the center rod 31 of the other shock absorber D2. The passage 31b, together with the central hole 30a, constitutes the rod interior passage L2 that opens onto the contraction side chamber 21.

A reference symbol S2 in FIGS. 2A and 2B denotes a full extension spring that alleviates an impact generated when the shock absorbers D1, D2 are fully extended.

Figure 3:
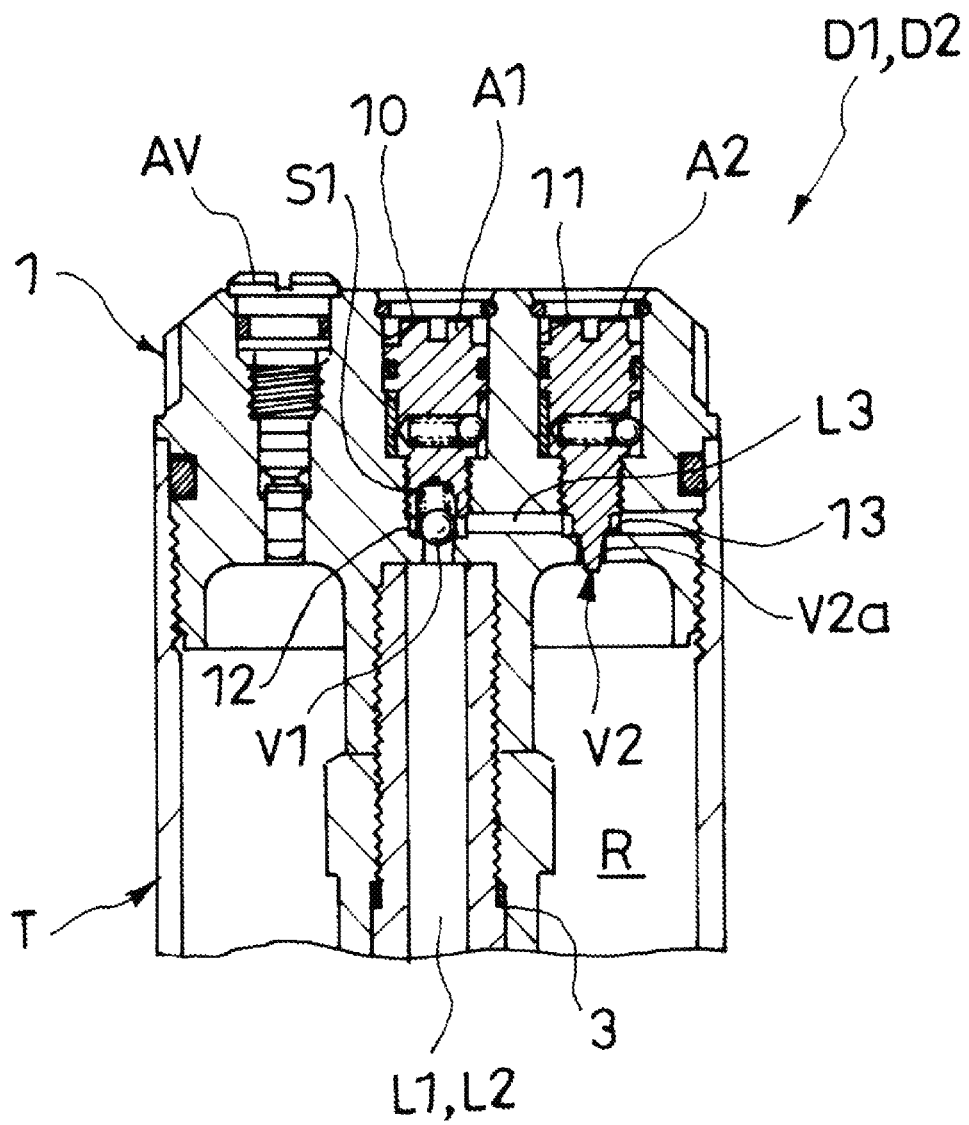
FIG. 3 is an enlarged longitudinal sectional view showing a specific example of a cap member part of the shock absorber according to one embodiment of this invention.

The cap member 1 that holds the piston rod 3 is common to the two shock absorbers D1, D2. As shown in FIG. 3, the single cap interior passage L3 that connects the rod interior passages L1, L2 to the reservoir R, and two attachment holes 10, 11 that extend from the outside into the cap interior passage L3 are formed in the cap member 1. The valve bodies V1, V2 are provided in the cap interior passage L3 in positions corresponding respectively to the attachment holes 10, 11. The valve bodies V1, V2 are disposed in series midway in the cap interior passage L3.

Further, screw threads (not illustrated with reference symbols) are formed respectively in the two attachment holes 10, 11, and the adjusters A1, A2 are screwed to the screw threads. Operating portions of the respective adjusters A1, A2 face outwards so that the respective adjusters A1, A2 can be operated from the outside of the tube member T. Furthermore, an air valve AV is attached to the cap member 1 so that the gas can be sucked into and discharged from the tube member T via the air valve AV.

The valve body V1 disposed in the cap interior passage L3 on the cylinder 2 side is a direction control valve. The valve body V1 is formed in a spherical shape, and pushed by a biasing spring S1 against an annular valve seat 12 provided midway in the cap interior passage L3. When a pressure on the cylinder 2 side (i.e. in the expansion side chamber 20 or the contraction side chamber 21 onto which the rod interior passages L1, L2 open) increases, the valve body V1 retreats against a biasing force of the biasing spring S1 so as to separate from the valve seat 12, and as a result, the valve opens. However, the valve body 1 is configured not to retreat against a force from the reservoir R side. Accordingly, the valve body V1 allows the working fluid to flow through the cap interior passage L3 from the cylinder 2 side toward the reservoir R side, but prevents the working fluid from flowing in the opposite direction. The adjuster A1 is positioned on a back surface of the valve body V1 so as to support an upper end of the biasing spring S1. The biasing force of the biasing spring S1 can be modified by turning the adjuster A1 forward and back, and in so doing, the valve opening pressure of the valve body V1 can be adjusted.

The valve body V2 disposed in the cap interior passage L3 on the reservoir R side is a flow control valve. An outer periphery of the valve body V2 narrows toward a tip end thereof so as to form a pointed end portion V2a, and thus the valve body 2 is formed in a needle shape. The pointed end portion V2a of the valve body V2 is inserted into an annular valve seat 13 provided midway in the cap interior passage L3 such that a throttle that restricts the flow of the working fluid passing through the cap interior passage L3 is formed between the pointed end portion V2a and the valve seat 13. The adjuster A2 is positioned on a back surface of the valve body V2 and formed integrally with the valve body V2. An opening amount (a throttle amount) of the valve body V2 can be adjusted by turning the adjuster A2 forward and back.

An operation of the suspension apparatus F including the shock absorbers D1, D2 according to this embodiment will be described below.

During an expansion operation of the suspension apparatus F, in which the vehicle wheel side tubes t2 of the pair of shock absorbers D1, D2 retreat from the vehicle body side tubes t1 and the piston rods 3 retreat from the cylinders 2 such that the two shock absorbers D1, D2 expand, the working fluid in the contracting expansion side chamber 20 of the shock absorber D1 opens the expansion side damping valve V3 and moves into the expanding contraction side chamber 21 through the expansion side piston passage 40. Further, working fluid in an amount corresponding to a volume by which the piston rod 3 retreats into the reservoir R from the cylinder 2 opens the expansion side check valve V5 so as to move from the reservoir R into the contraction side chamber 21 through the expansion side base member passage 60.

Furthermore, the working fluid in the expansion side chamber 20 of the shock absorber D1 opens the cylinder 2 side valve body V1 so as to flow into the cap interior passage L3 through the rod interior passage L1, and then moves into the reservoir R through the throttle formed by the reservoir R side valve body V2. As a result, the shock absorber D1 generates expansion side damping force from resistance generated by the expansion side damping valve V3, the expansion side check valve V5, and the cylinder 2 side and reservoir R side valve bodies V1, V2. As described above, the resistance generated by the expansion side check valve V5 is set to be comparatively small, and therefore the expansion side damping force generated by the shock absorber D1 is derived mainly from the resistance of the expansion side damping valve V3 and the valve bodies V1, V2.

By operating the adjuster A1 positioned on the back surface of the cylinder 2 side valve body V1 of the shock absorber D1, the biasing force of the biasing spring S1 can be adjusted. Hence, when the biasing force of the biasing spring S1 is reduced by turning the adjuster A1 of the shock absorber D1 back, for example, the valve body V1 opens more easily. Accordingly, the opening amount of the valve body V1 relative to the speed of the piston 4 can be increased, and as a result, the expansion side damping force generated before the valve body V1 reaches a fully open condition while the speed of the piston 4 is in a low speed region can be reduced. When the adjuster A1 of the shock absorber D1 is turned forward, on the other hand, the expansion side damping force generated when the speed of the piston 4 is in the low speed region can be increased.

Further, by operating the adjuster A2 positioned on the back surface of the reservoir R side valve body V2 of the shock absorber D1, an opening area of the throttle formed by the valve body V2 can be adjusted. Accordingly, the opening area of the throttle can be increased by turning the adjuster A2 of the shock absorber D1 back, for example. As a result, the expansion side damping force generated after the cylinder 2 side valve body V1 reaches the fully open condition while the speed of the piston 4 is in a medium/high speed region can be reduced. When the adjuster A2 of the shock absorber D1 is turned forward, on the other hand, the expansion side damping force generated when the speed of the piston 4 is in the medium/high speed region can be increased.

During the expansion operation of the suspension apparatus F, the working fluid in the contracting expansion side chamber 20 of the other shock absorber D2 opens the expansion side damping valve V3 so as to move into the expanding contraction side chamber 21 through the expansion side piston passage 40. Further, working fluid in an amount corresponding to the volume by which the piston rod 3 retreats into the reservoir R from the cylinder 2 opens the expansion side check valve V5 so as to move from the reservoir R into the contraction side chamber 21 through the expansion side base member passage 60. As a result, the shock absorber D2 generates expansion side damping force from resistance generated by the expansion side damping valve V3 and the expansion side check valve V5. As described above, the resistance generated by the expansion side check valve V5 is set to be comparatively small, and therefore the expansion side damping force generated by the shock absorber D2 is derived mainly from the resistance of the expansion side damping valve V3.

The expansion side damping force generated during the expansion operation of the suspension apparatus F is a resultant force of the expansion side damping force generated by the shock absorber D1 and the expansion side damping force generated by the shock absorber D2. Therefore, the expansion side damping force generated by the suspension apparatus F when the speed of the piston 4 is in the low speed region can be adjusted using the cylinder 2 side adjuster A1 of the shock absorber D1. Further, the expansion side damping force generated by the suspension apparatus F when the speed of the piston 4 is in the medium/high speed region can be adjusted using the reservoir R side adjuster A2 of the shock absorber D1.

During a contraction operation of the suspension apparatus F, in which, conversely, the vehicle wheel side tubes t2 of the pair of shock absorbers D1, D2 advance into the vehicle body side tubes t1 and the piston rods 3 advance into the cylinders 2 such that the two shock absorbers D1, D2 contract, the working fluid in the contracting contraction side chamber 21 of the shock absorber D1 opens the contraction side check valve V4 so as to move into the expanding expansion side chamber 20 through the contraction side piston passage 41. Further, working fluid in an amount corresponding to a volume by which the piston rod 3 advances into the cylinder 2 opens the contraction side damping valve V6 so as to move from the contraction side chamber 21 into the reservoir R through the contraction side base member passage 61. As a result, the shock absorber D1 generates contraction side damping force from resistance generated by the contraction side check valve V4 and the contraction side damping valve V6. As described above, the resistance generated by the contraction side check valve V4 is set to be comparatively small, and therefore the contraction side damping force generated by the shock absorber D1 is derived mainly from the resistance of the contraction side damping valve V6.

Furthermore, during the contraction operation of the suspension apparatus F, the working fluid in the contracting contraction side chamber 21 of the shock absorber D2 opens the contraction side check valve V4 so as to move into the expanding expansion side chamber 20 through the contraction side piston passage 41. Further, working fluid in an amount corresponding to the volume by which the piston rod 3 advances into the cylinder 2 opens the contraction side damping valve V6 so as to move from the contraction side chamber 21 into the reservoir R through the contraction side base member passage 61.

Moreover, the working fluid in the contraction side chamber 21 of the shock absorber D2 opens the cylinder 2 side valve body V1 so as to flow into the cap interior passage L3 through the rod interior passage L2, and then moves into the reservoir R through the throttle formed by the reservoir R side valve body V2. As a result, the shock absorber D2 generates contraction side damping force from resistance generated by the contraction side check valve V4, the contraction side damping valve V6, and the cylinder 2 side and reservoir R side valve bodies V1, V2. As described above, the resistance generated by the contraction side check valve V4 is set to be comparatively small, and therefore the contraction side damping force generated by the shock absorber D2 is derived mainly from the resistance of the contraction side damping valve V6 and the valve bodies V1, V2.

The contraction side damping force generated during the contraction operation of the suspension apparatus F is a resultant force of the contraction side damping force generated by the shock absorber D1 and the contraction side damping force generated by the shock absorber D2. Therefore, the contraction side damping force generated by the suspension apparatus F when the speed of the piston 4 is in the low speed region can be adjusted using the cylinder 2 side adjuster A1 of the shock absorber D2, and the contraction side damping force generated by the suspension apparatus F when the speed of the piston 4 is in the medium/high speed region can be adjusted using the reservoir R side adjuster A2 of the shock absorber D2.

In the above description, the speed of the piston 4 is divided into the low speed region and the medium/high speed region, but thresholds of the respective regions may be set as desired.

Actions and effects of the shock absorbers D1, D2 according to this embodiment and the suspension apparatus F including the shock absorbers D1, D2 will be described below.

In this embodiment, the suspension apparatus F includes the pair of shock absorbers D1, D2. In the shock absorber D1, the rod interior passage L1 opens onto the expansion side chamber 20 so that the expansion side damping force can be adjusted using the adjusters A1, A2, and in the shock absorber D2, the rod interior passage L2 opens onto the contraction side chamber 21 so that the contraction side damping force can be adjusted using the adjusters A1, A2.

According to this configuration, the shock absorber D1 can be used to adjust the expansion side damping force and the other shock absorber D2 can be used to adjust the contraction side damping force simply by varying the chamber (of the expansion side chamber 20 and the contraction side chamber 21), onto which the rod interior passages L1, L2 open, between the pair of shock absorbers D1, D2. In other words, the pair of shock absorbers D1, D2 constituting the suspension apparatus F can be configured so that many components such as the adjusters A1, A2 and the valve bodies V1, V2 are common thereto, and as a result, an increase in the number of types of components constituting the suspension apparatus F can be suppressed. Note that a configuration in which the adjusters A1, A2, the valve bodies V1, V2, and so on differ between the shock absorber D1 and the shock absorber D2 may also be employed.

Further, the configuration of the suspension apparatus F may be modified appropriately. For example, in a case where the suspension apparatus F includes the pair of shock absorbers D1, D2 according to this embodiment, the shock absorber D1 that is capable of adjusting the expansion side damping force may be configured to generate the expansion side damping force but not to generate the contraction side damping force, and the shock absorber D2 that is capable of adjusting the contraction side damping force may be configured to generate the contraction side damping force but not to generate the expansion side damping force. Moreover, a configuration in which only one of the pair of shock absorbers constituting the suspension apparatus F is used as the shock absorbers D1, D2 according to this embodiment may be employed.

In this embodiment, the valve body V1 serving as the direction control valve is formed in a spherical shape and pushed by the biasing spring S1 against the annular valve seat 12 provided midway in the cap interior passage L3. The adjuster A1 modifies the valve opening pressure of the valve body V1 serving as the direction control valve so as to adjust the damping force generated when the speed of the piston 4 is in the low speed region. Further, the valve body V2 serving as the flow control valve is formed in a needle shape, and the pointed end portion V2a thereof is inserted into the annular valve seat 13 provided midway in the cap interior passage L3. The adjuster A2 modifies the opening amount of the valve body V2 serving as the flow control valve so as to adjust the damping force generated when the speed of the piston 4 is in the medium/high speed region.

According to this configuration, two types of damping force, namely the damping force generated when the speed of the piston 4 is in the low speed region and the damping force generated when the speed of the piston 4 is in the medium/high speed region, can be adjusted easily even though the valve body V1 serving as the direction control valve and the valve body V2 serving as the flow control valve are disposed in series. In this embodiment, the spherical valve body V1 is used to generate damping force in the low speed region, and the needle-shaped valve body V2 is used to generate damping force in the medium/high speed region. It should be noted that when the two valve bodies V1, V2 are disposed in parallel, the spherical valve body V1 may be used to generate damping force in the medium/high speed region, and the needle-shaped valve body V2 may be used to generate damping force in the low speed region.

Furthermore, in this embodiment, the valve body V1 is a direction control valve that allows the working fluid to flow from the cylinder 2 side toward the reservoir R side and prevents the working fluid from flowing in the opposite direction, while the valve body V2 is a flow control valve that restricts the flow of the working fluid passing through the cap interior passage L3. Moreover, the valve body V1 serving as the direction control valve and the valve body V2 serving as the flow control valve are disposed in series.

According to this configuration, the gas in the reservoir R can be prevented from infiltrating the cylinder 2 by the valve body V1 serving as the direction control valve. Further, in comparison with a case where the valve bodies V1, V2 are disposed in parallel, the cap interior passage L3 can be simplified in shape, and as a result, the cap member 1 can be formed more easily. It should be noted that the two valve bodies V1, V2 may be disposed in parallel, but in this case, a check valve is preferably provided in series with the valve body V2 serving as the flow control valve in order to prevent the gas in the reservoir R from infiltrating the cylinder 2.

Further, in this embodiment, the valve body V1 serving as the direction control valve is disposed on the cylinder 2 side, and the valve body V2 serving as the flow control valve is disposed on the reservoir R side.

When the valve body V1 serving as the direction control valve is formed in a spherical shape, as in this embodiment, the valve body V1, the biasing spring S1, and the adjuster A1 are preferably arranged collinearly such that a pressure from the cylinder 2 side is exerted on the valve body V1 from an opposite side to the biasing spring S1. According to this configuration, the valve body V1 serving as the direction control valve can be disposed in a central part of the cap member 1 so as to oppose the rod interior passages L1, L2, and as a result, the pressure from the cylinder 2 side can easily be exerted on the valve body V1 from the opposite side to the biasing spring S1. It should be noted that the valve bodies V1, V2 may be disposed in an inverted arrangement.

Furthermore, in this embodiment, the shock absorbers D1, D2 include the telescopic tube member T constituted by the vehicle body side tube t1 and the vehicle wheel side tube t2, the cap member 1 that closes the upper side opening of the vehicle body side tube t1, the cylinder 2 erected in the axial center portion of the vehicle wheel side tube t2, the piston rod 3 held by the cap member 1 so as to enter and exit the cylinder 2, the piston 4 held by the piston rod 3 so as to move through the cylinder 2 in the axial direction, the reservoir R formed between the tube member T and the cylinder 2, the expansion side chamber 20 and the contraction side chamber 21 that are formed in the cylinder 2, defined by the piston 4, and filled with the working fluid, the rod interior passages L1, L2 formed in the piston rod 3 so as to extend in the axial direction of the piston rod 3 and open onto either the expansion side chamber 20 or the contraction side chamber 21, the cap interior passage L3 formed in the cap member 1 so as to connect the rod interior passages L1, L2 to the reservoir R, the plurality of valve bodies V1, V2 provided in series midway in the cap interior passage L3, and the plurality of adjusters A1, A2 attached to the cap member 1 so as to be capable of adjusting the valve opening pressure or the opening amount of the valve bodies V1, V2.

According to this configuration, the adjusters A1, A2 and the valve bodies V1, V2 that are operated by the adjusters A1, A2 are respectively attached to the cap member 1, and therefore respective distances between the adjusters A1, A2 and the valve bodies V1, V2 are short. Hence, there is no need to use a pushrod or the like, as in a conventional shock absorber. As a result, an increase in the number of constituent components of the shock absorbers D1, D2 can be suppressed and the structure of the shock absorbers D1, D2 can be simplified even while enabling adjustment of a plurality of types of damping force.

Next, a shock absorber according to another embodiment of this invention will be described with reference to the figures. This embodiment differs from the above embodiment mainly in the cap interior passage and the valve bodies provided midway in the cap interior passage. Accordingly, the cap interior passage and the valve bodies provided midway in the cap interior passage will be described in detail below, while description of other configurations that have already been described in the above embodiment with reference to FIGS. 1 and 2 will be omitted.

Figure 4:
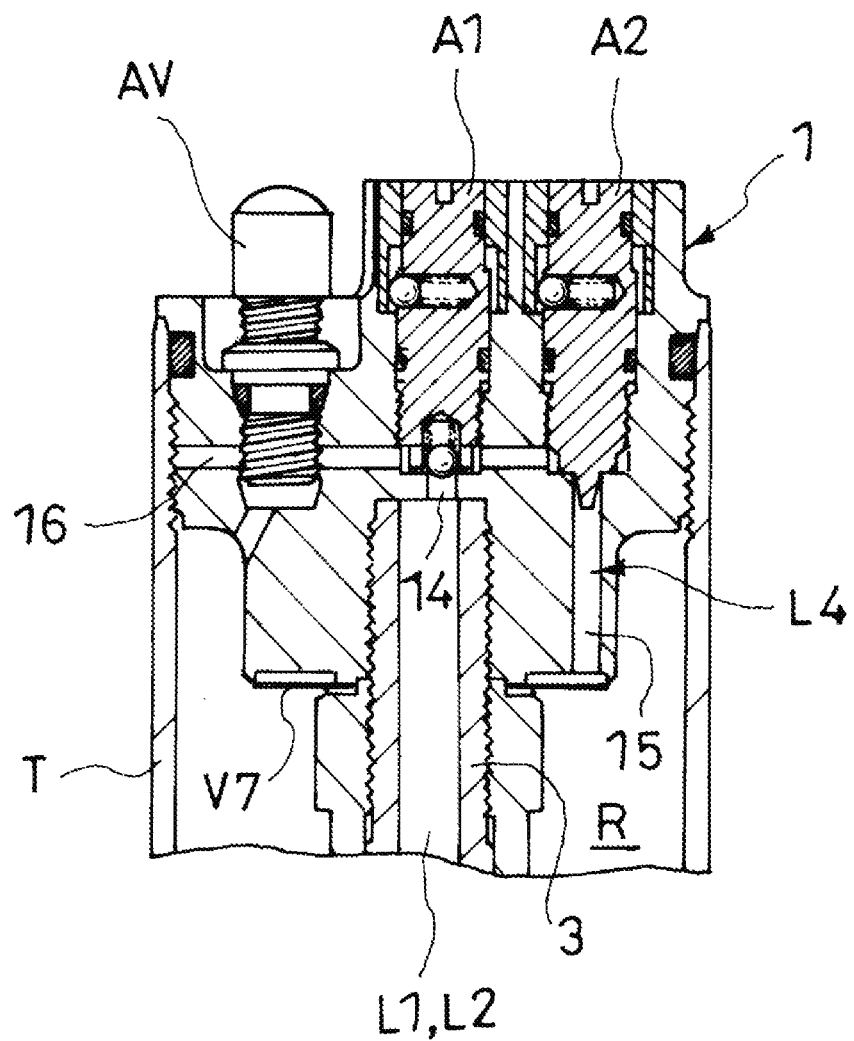
FIG. 4 is an enlarged longitudinal sectional view showing a specific example of a cap member part of a shock absorber according to another embodiment of this invention.

As shown in FIG. 4, in this embodiment, a cap interior passage L4 is configured to include a central vertical hole 14 that is drilled into a central portion of the cap member 1 in the axial direction so as to extend into the rod interior passage L1, L2, an outer peripheral vertical hole 15 that is drilled into an outer peripheral portion of the cap member 1 in the axial direction so as to open onto the reservoir R, and a lateral hole 16 that is drilled into the central portion of the cap member 1 in a radial direction so as to connect the central vertical hole 14 to the outer peripheral vertical hole 15. The lateral hole 16 opens onto a side face of the cap member 1 on an opposite side to the outer peripheral vertical hole 15, but the opening of the lateral hole 16 is cut off from the central vertical hole 14 by the air valve AV.

Three valve bodies V1, V2, V7 are provided midway in the cap interior passage L4 and disposed in series. The first valve body V1 and the second valve body V2 from the cylinder 2 side are identical to the above embodiment, and therefore the valve opening pressure and the opening amount thereof can be adjusted using similar adjusters A1, A2 to the above embodiment. In this embodiment, the valve body V7, which is disposed furthest toward the reservoir R side in the cap interior passage L4, is a check valve constituted by an annular plate-shaped leaf valve laminated onto a lower side of the cap member 1. The valve body V7 allows the working fluid to move through the cap interior passage L4 from the cylinder 2 side to the reservoir R side, but prevents the working fluid from flowing in an opposite direction. Resistance generated by the valve body V7 is set to be comparatively small.

According to this configuration, the valve body V7 is provided on the reservoir R side of the valve body V2, which serves as the flow control valve, in order to prevent backflow from the reservoir R side, and therefore the working fluid on a downstream side of the valve body V1, which serves as the direction control valve, can be prevented from flowing out into the reservoir R. Further, the lateral hole 16 constituting the cap interior passage L4 is closed by the air valve AV, and therefore processing for forming the cap interior passage L4 can be performed easily even when the reservoir R side opening of the cap interior passage L4 is closed by the valve body V7.

The embodiments of the present invention described above are merely illustration of some application examples of the present invention and not of the nature to limit the technical scope of the present invention to the specific constructions of the above embodiments.

The present application claims a priority based on Japanese Patent Application No. 2013-196348 filed with the Japan Patent Office on Sep. 24, 2013, all the contents of which are hereby incorporated by reference.

The invention claimed is:

1. A shock absorber comprising:
   a telescopic tube member configured to include a vehicle body side tube and a vehicle wheel side tube;
   a cap member that closes an upper side opening of the vehicle body side tube;
   a cylinder erected in an axial center portion of the vehicle wheel side tube;
   a piston rod held by the cap member and configured to enter and exit the cylinder;
   a piston held by the piston rod and configured to move through the cylinder in an axial direction;
   a reservoir formed between the tube member and the cylinder;
   an expansion side chamber and a contraction side chamber that are formed in the cylinder, defined by the piston, and configured to be filled with a working fluid;
   a rod interior passage formed in the piston rod, and configured to extend in an axial direction of the piston rod and open onto either the expansion side chamber or the contraction side chamber;
   a cap interior passage formed in the cap member and configured to connect the rod interior passage to the reservoir;
   a plurality of valve bodies provided in series or in parallel midway in the cap interior passage; and
   a plurality of adjusters attached to the cap member and configured to be capable of adjusting a valve opening pressure or an opening amount of the plurality of valve bodies.

2. The shock absorber according to claim 1, wherein
   one of the plurality of valve bodies is a direction control valve that allows the working fluid to flow from the cylinder side toward the reservoir side but prevents the working fluid from flowing in an opposite direction;
   another of the plurality of valve bodies is a flow control valve that restricts a flow of the working fluid passing through the cap interior passage; and
   the valve body serving as the direction control valve and the valve body serving as the flow control valve are disposed in series.

3. The shock absorber according to claim 2, wherein
   the valve body serving as the direction control valve is formed in a spherical shape and pushed by a biasing spring against an annular valve seat provided midway in the cap interior passage;
   one of the plurality of adjusters modifies the valve opening pressure of the valve body serving as the direction control valve in order to adjust a damping force generated when a speed of the piston is in a low speed region;
   the valve body serving as the flow control valve is formed in a needle shape, a pointed end portion thereof being inserted into an annular valve seat provided midway in the cap interior passage; and
   another of the plurality of adjusters modifies the opening amount of the valve body serving as the flow control valve in order to adjust a damping force generated when the speed of the piston is in a medium/high speed region.

4. A suspension apparatus comprising the shock absorber according to claim 1 in a pair, wherein
   the rod interior passage of one of the shock absorbers opens onto the expansion side chamber so that an expansion side damping force can be adjusted by the adjuster; and
   the rod interior passage of the other shock absorber opens onto the contraction side chamber so that a contraction side damping force can be adjusted by the adjuster.

* * * * *